United States Patent
Brainos, II et al.

(10) Patent No.: US 7,733,793 B1
(45) Date of Patent: Jun. 8, 2010

(54) SYSTEM AND METHOD FOR SUPPRESSING SILENCE DATA IN A NETWORK ENVIRONMENT

(75) Inventors: Alain Charles Brainos, II, Creedmoor, NC (US); Mohammad A. Ahmed-Khan, Raleigh, NC (US); Malcolm M. Smith, Calgary (CA)

(73) Assignee: Cisco Technology, Inc., San Jose, CA (US)

( * ) Notice: Subject to any disclaimer, the term of this patent is extended or adjusted under 35 U.S.C. 154(b) by 1181 days.

(21) Appl. No.: 10/732,138

(22) Filed: Dec. 10, 2003

(51) Int. Cl.
*H04L 12/56* (2006.01)
*G10L 19/00* (2006.01)

(52) U.S. Cl. .................. 370/252; 370/468; 704/201; 704/501

(58) Field of Classification Search .......... 370/252, 370/392, 468, 521, 229–232, 253, 389, 400, 370/401, 412, 413, 415, 417; 455/470, 570; 379/392, 392.01; 704/201, 210, 215, 226, 704/227, 500, 501, 503, 504
See application file for complete search history.

(56) References Cited

U.S. PATENT DOCUMENTS

| | | | |
|---|---|---|---|
| 4,747,096 A | 5/1988 | Piasecki et al. ........... 370/81 |
| 4,860,313 A | 8/1989 | Shpiro ................. 375/27 |
| 5,117,453 A | 5/1992 | Piasecki et al. .......... 379/100 |
| 5,475,686 A | 12/1995 | Bach et al. ............. 370/84 |
| 5,497,505 A | 3/1996 | Koohgoli et al. ......... 455/34.1 |
| 5,894,557 A | 4/1999 | Bade et al. ........... 395/200.58 |
| 5,897,613 A * | 4/1999 | Chan ................... 704/210 |
| 5,905,736 A | 5/1999 | Ronen et al. ........... 370/546 |
| 5,953,666 A | 9/1999 | Lehtimäki ............. 455/439 |
| 5,956,391 A | 9/1999 | Melen et al. ........... 379/114 |
| 5,970,477 A | 10/1999 | Roden ................. 705/32 |
| 6,038,231 A * | 3/2000 | Dolby et al. ........... 370/394 |
| 6,047,051 A | 4/2000 | Ginzboorg et al. ...... 379/130 |
| 6,055,502 A * | 4/2000 | Kitamura .............. 704/500 |
| 6,134,245 A | 10/2000 | Scarmalis ............. 370/474 |
| 6,138,089 A * | 10/2000 | Guberman ............. 704/207 |
| 6,192,051 B1 | 2/2001 | Lipman et al. ......... 370/389 |

(Continued)

FOREIGN PATENT DOCUMENTS

WO  WO 98/26381  6/1998

(Continued)

OTHER PUBLICATIONS

PCT Notification of Transmittal of the International Search Report and the Written Opinion of the International Searching Authority, or the Declaration, PCT/US2004/005742, 10 pages, Nov. 16, 2004.

(Continued)

*Primary Examiner*—Aung S Moe
*Assistant Examiner*—Kerri M Rose
(74) *Attorney, Agent, or Firm*—Baker Botts L.L.P.

(57) ABSTRACT

A method for suppressing data is provided that includes receiving a first packet communicated by an end user and identifying a difference in a comfort noise level associated with a second packet received as compared to the first packet. The second packet may be communicated without a data payload in cases where the difference in comfort noise level associated with the second packet as compared to the first packet is below a predetermined threshold.

20 Claims, 2 Drawing Sheets

U.S. PATENT DOCUMENTS

| | | | |
|---|---|---|---|
| 6,321,179 B1 * | 11/2001 | Glance et al. | 702/189 |
| 6,363,065 B1 | 3/2002 | Thornton et al. | 370/352 |
| 6,400,722 B1 | 6/2002 | Chuah et al. | 370/401 |
| 6,424,940 B1 | 7/2002 | Agassy et al. | 704/219 |
| 6,477,595 B1 | 11/2002 | Cohen et al. | 710/105 |
| 6,512,754 B2 | 1/2003 | Feder et al. | 370/338 |
| 6,512,773 B1 | 1/2003 | Scott | 370/395.61 |
| 6,512,790 B1 | 1/2003 | Sourani | 375/240 |
| 6,535,521 B1 | 3/2003 | Barghouti et al. | 370/462 |
| 6,581,032 B1 * | 6/2003 | Gao et al. | 704/222 |
| 6,785,540 B1 * | 8/2004 | Wichelman | 455/423 |
| 6,959,274 B1 | 10/2005 | Gao et al. | 704/219 |
| 7,003,093 B2 * | 2/2006 | Prabhu et al. | 379/390.02 |
| 7,027,804 B2 * | 4/2006 | Mufti et al. | 455/417 |
| 2001/0029457 A1 * | 10/2001 | Shaffer et al. | 704/504 |
| 2002/0059114 A1 | 5/2002 | Cockrill et al. | 705/27 |
| 2002/0154764 A1 | 10/2002 | Ahmad | 379/406.12 |
| 2003/0152105 A1 | 8/2003 | Arimilli | 370/468 |
| 2004/0077345 A1 * | 4/2004 | Turner et al. | 455/423 |
| 2004/0179555 A1 * | 9/2004 | Smith | 370/521 |
| 2006/0067253 A1 * | 3/2006 | Gummalla et al. | 370/278 |
| 2008/0151898 A1 * | 6/2008 | Gentle et al. | 370/392 |

FOREIGN PATENT DOCUMENTS

| | | |
|---|---|---|
| WO | WO 99/31610 | 6/1999 |
| WO | WO 99/35875 | 7/1999 |
| WO | WO 00/64204 | 10/2000 |

OTHER PUBLICATIONS

United States Patent and Trademark Office; *Office Action* for U.S. Appl. No. 10/387,195, filed Mar. 11, 2003 in the name of Malcolm M. Smith, 12 pages, Dec. 8, 2006.

United States Patent and Trademark Office; *Final Office Action* for U.S. Appl. No. 10/387,195, filed Mar. 11, 2003 in the name of Malcolm M. Smith, 11 pages, May 10, 2007.

United States Patent and Trademark Office; *Advisory Action Before the Filing of an Appeal Brief* for U.S. Appl. No. 10/387,195, filed Mar. 11, 2003 in the name of Malcolm M. Smith, 3 pages, Jul. 23, 2007.

United States Patent and Trademark Office; *Office Action* for U.S. Appl. No. 10/387,195, filed Mar. 11, 2003 in the name of Malcolm M. Smith, 10 pages, Nov. 1, 2007.

United States Patent and Trademark Office; *Final Office Action* for U.S. Appl. No. 10/387,195, filed Mar. 11, 2003 in the name of Malcolm M. Smith, 11 pages, Mar. 21, 2008.

United States Patent and Trademark Office; *Advisory Action Before the Filing of an Appeal Brief* for U.S. Appl. No. 10/387,195, filed Mar. 11, 2003 in the name of Malcolm M. Smith, 3 pages, May 30, 2008.

United States Patent and Trademark Office; *Office Action* for U.S. Appl. No. 10/387,195, filed Mar. 11, 2003 in the name of Malcolm M. Smith, 10 pages, Sep. 10, 2008.

United States Patent and Trademark Office; *Final Office Action* for U.S. Appl. No. 10/387,195, filed Mar. 11, 2003 in the name of Malcolm M. Smith, 14 pages, Mar. 19, 2009.

* cited by examiner

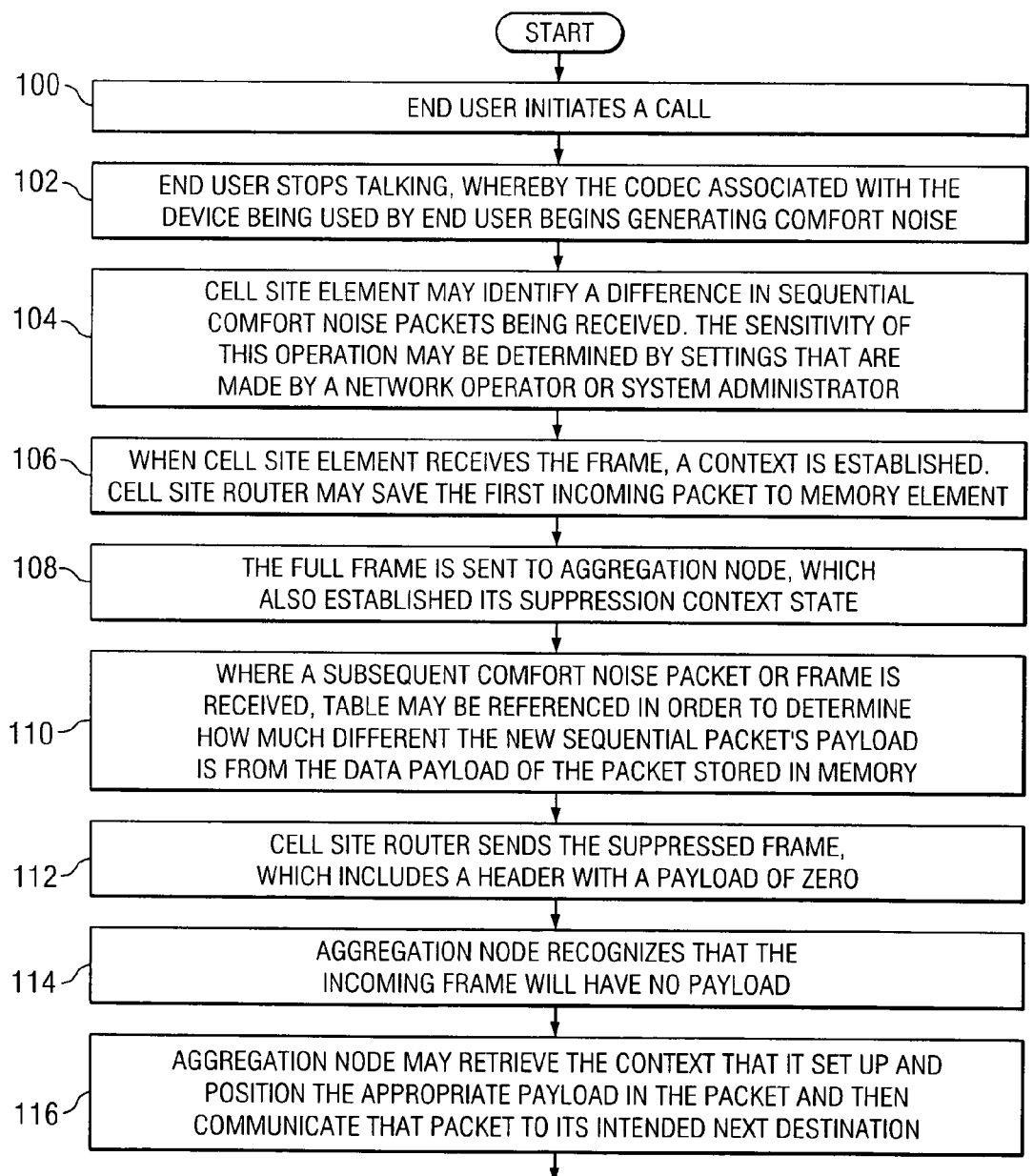

SYSTEM AND METHOD FOR SUPPRESSING SILENCE DATA IN A NETWORK ENVIRONMENT

TECHNICAL FIELD OF THE INVENTION

The present invention relates in general to the field of network communications and, more particularly, to a system and a method for suppressing silence data in a network environment.

BACKGROUND OF THE INVENTION

Communication systems and architectures have become increasingly important in today's society. One aspect of communications relates to maximizing bandwidth and minimizing delays associated with data and information exchanges. In compression scenarios, network operators generally seek to produce high percentages of gain in compression for any given transport that is being implemented. Many proposed solutions for effectuating proper data exchanges add significant overhead and cost in order to accommodate a large number of end users. For example, a large number of T1/E1 lines may be implemented, but such lines are generally expensive and, thus, each one should be maximized in order to achieve optimal system performance. A provider generally leases T1 lines from a third party. Therefore, minimizing the number of T1 lines needed to accommodate a given communication architecture is pivotal in controlling cost expenditures. Operations that achieve a suitable level of compression at the expense of sacrificing valuable TI/EI lines are not feasible for service providers. Accordingly, the ability to provide a communications system that consumes few resources, optimizes bandwidth, and achieves minimal delay presents a significant challenge for network designers and system administrators.

SUMMARY OF THE INVENTION

From the foregoing, it may be appreciated by those skilled in the art that a need has arisen for an improved suppression approach that optimizes data exchanges in a communications environment. In accordance with one embodiment of the present invention, a system and a method for suppressing comfort noise data in a network environment are provided that substantially eliminate or greatly reduce disadvantages and problems associated with conventional compression techniques.

According to one embodiment of the present invention, there is provided a system for suppressing comfort noise data that includes receiving a first packet communicated by an end user and identifying a difference in a comfort noise level associated with a second packet received as compared to the first packet. The second packet may be communicated without a data payload in cases where the difference in comfort noise level associated with the second packet as compared to the first packet is below a predetermined threshold.

Certain embodiments of the present invention may provide a number of technical advantages. For example, according to one embodiment of the present invention, a communications approach is provided that significantly enhances bandwidth parameters for a given architecture. This is a result of a suppression technique that accounts for comfort noise on the communications link. The suppression approach may suppress comfort noise on the back-haul interface, which in turn provides improved link efficiency. The use of equivalent comfort noise generation, instead of exact comfort noise exchanges, may improve efficiency even more. Moreover, such silence suppression arrangements, with the addition of header compression, is superior to simple header compression operations.

Another technical advantage associated with one embodiment of the present invention relates to its flexibility. The suppression approach provided may be leveraged in virtually any communications architecture. For example, the suppression approach offered by the present invention may be used in cooperation with a base transceiver station/base station controller configuration to deliver optimal bandwidth for a network manager. Additionally, such a suppression technique may result in a reduction in cost expenditures, as fewer T1 lines would be needed to accommodate the same amount of data. This is due to the system's ability to emulate comfort noise, which reduces the amount of traffic (some of which may be immaterial to the data exchange) between two nodes. Certain embodiments of the present invention may enjoy some, all, or none of these advantages. Other technical advantages may be readily apparent to one skilled in the art from the following figures, description, and claims.

BRIEF DESCRIPTION OF THE DRAWINGS

For a more complete understanding of the present invention and the advantages thereof, reference is made to the following description taken in conjunction with the accompanying drawings, wherein like reference numerals represent like parts, in which:

FIG. 2 is a simplified block diagram of an example implementation of some of the components that may be included in the communication system; and FIG. 3 is a simplified flowchart illustrating a series of example steps associated with the communication system.

DETAILED DESCRIPTION OF EXAMPLE EMBODIMENTS OF THE INVENTION

Figure 1:
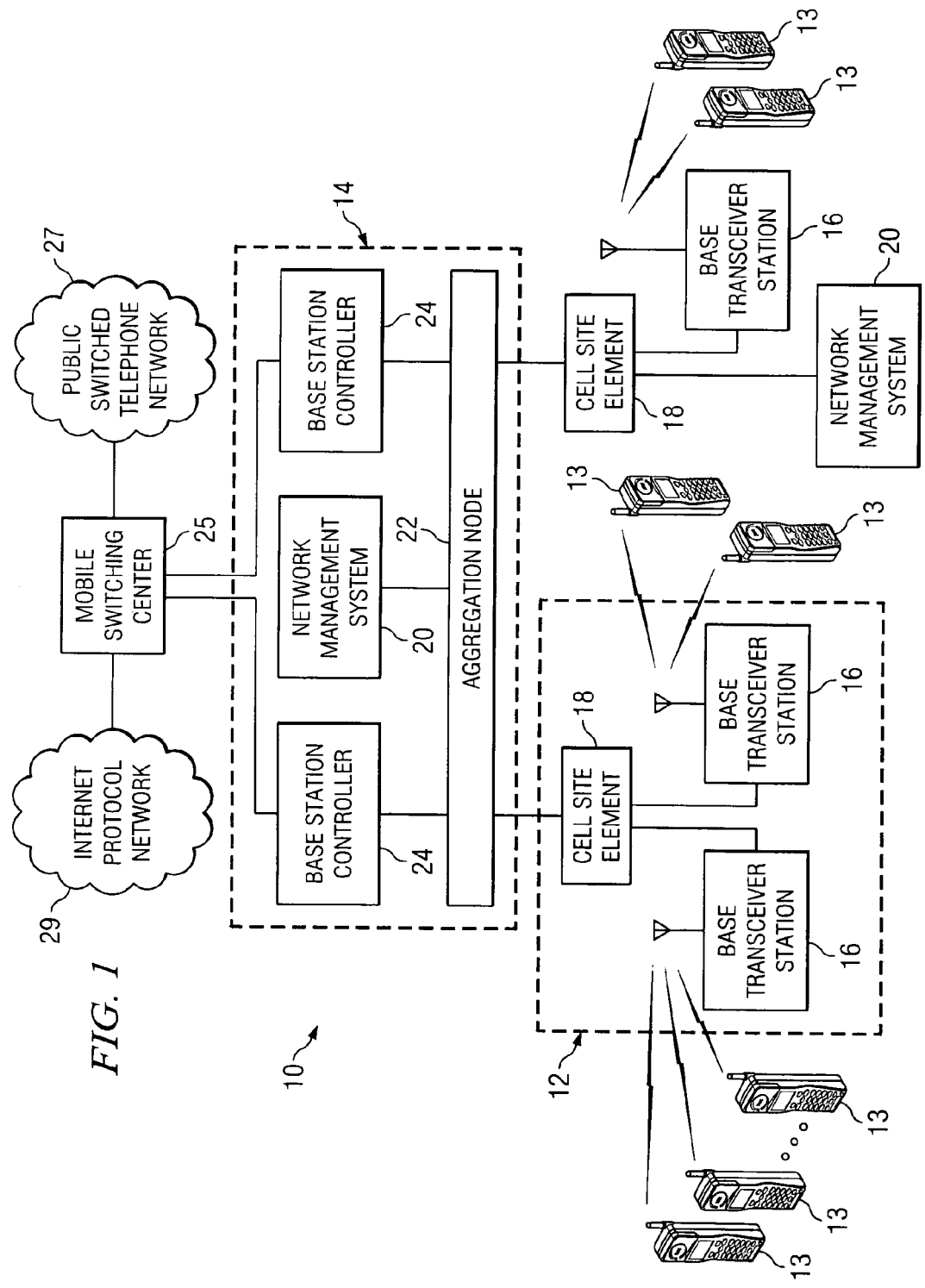
FIG. 1 is a simplified block diagram of a communication system for suppressing comfort noise data in accordance with one embodiment of the present invention.

FIG. 1 is a simplified block diagram of a communication system 10 for suppressing comfort noise data in a communications environment. Communication system 10 may include a plurality of cell sites 12, a plurality of mobile stations 13, a central office site 14, a plurality of base transceiver stations 16, a plurality of cell site elements 18, and a network management system 20. Additionally, communication system may include an aggregation node 22, a plurality of base station controllers 24, a mobile switching center 25, a public switched telephone network (PSTN) 27, and an internet protocol (IP) network 29.

Communication system 10 may generally be configured or arranged to represent a 2.5G architecture applicable to a Global System for Mobile (GSM) environment in accordance with a particular embodiment of the present invention. However, the 2.5G architecture is offered for purposes of example only and may alternatively be substituted with any suitable networking system or arrangement (e.g. first generation, 2G, etc.) that provides a communicative platform for communication system 10. For example, the present invention may be used in conjunction with a 3G network, where 3G equivalent networking equipment is provided in the architecture. Communication system 10 is versatile in that it may be used in a host of communications environment such as in conjunction with any code-division or time-division multiple access (CDMA or TDMA) element or protocol for example.

In accordance with the teachings of the present invention, a suppression approach is provided that suppresses comfort noise on the back-haul (e.g. A-bis) interface, providing for improved link efficiency. Comfort noise may be as much as 50-60% of a given conversation and, therefore, its minimization can result in significant bandwidth savings. The use of equivalent comfort noise generation, instead of exact comfort noise transmissions, improves efficiency in T1/E1 link utilization. Additionally, silence suppression in conjunction with header compression is more advantageous than simple header compression scenarios.

For purposes of teaching, it is helpful to offer some discussion of the environment in which communication system 10 operates. In many communication architectures (e.g. GSM, TDMA, etc.), the air-interface may use a discontinuous transmission (DTX) mode when the user is not speaking (i.e. no bits are transmitted over the air when there is no voice signal present). This translates to an improvement in power usage and capacity on the air-interface but this does not result in any back-haul (BTS-BSC) bandwidth savings because the voice/data traffic is still being transported. In CDMA-based systems (e.g. CDMA-2000, WCDMA), the air-interface may implement DTX operations (or the equivalent) by using a low bit-rate mode (e.g. ⅛th of the full-rate used for a full voice sample).

Due to the fact that the air-interface generally needs data for this ⅛th rate, a given mobile station and transcoder (XC) may provide a voice sample to the air-interface even in cases when no voice signal is present. This voice signal is typically comfort noise that characterizes the background noise. This noise is usually not critical to human communications (i.e. two parties may reasonably communicate without comfort noise accommodations).

Communication system 10 may leverage this characteristic in order to deliver improved bandwidth parameters in network communications. Comfort noise voice samples from the BTS/BSC can be suppressed and/or manipulated by a compressor (potentially included in cell site element 18) in order to reduce the number of bytes that need to be transmitted over the back-haul for a given voice call. A decompressor (potentially included in aggregation node 22) may provide the voice sample to the BTS/BSC based on the history and the state of the voice call. The decompressor can either replicate the voice signal (i.e. comfort noise) exactly as it was received by the compressor or, alternatively, the decompressor can provide an equivalent signal that approximates the intended comfort noise experience of the user (e.g. noise that approximates a car, plane, train, wind, etc.). Thus, the comfort noise packet in voice calls is intended to simulate background or atmospheric noise when end users or parties participating in the call are not communicating. Mobile station 13 may include a codec, which is operable to provide this two-byte piece of information during the call. Note that this payload may be more or less than sixteen bits: potentially dependent on the type of codec that is being used.

Communication system 10 addresses comfort noise by providing a tunable feature that significantly reduces the information that is being relayed between two points. Communication system 10 may suitably suppress the background noise in order to achieve a significant reduction in bandwidth being consumed for the call. For example, when an end user stops talking, the codec (included in the device being used by the end user) can identify that voice transmissions have ceased and the codec may begin generating predetermined comfort noise. A payload (e.g. two-byte) may be used to provide this predetermined comfort noise, which may be subsequently received by cell site element 18. A compressor (or any other suitable device or element) provided in cell site element 18 may receive this information and measure the difference in any incoming comfort noise and the comfort noise already received. In a reciprocal fashion, aggregation node 22 (e.g. a decompressor included therein) may receive data from cell site element 18 that signals that a consistent level of comfort noise is being communicated on the link. Aggregation node 22 may respond by taking the most recent comfort noise payload, which may be stored in appropriate memory at aggregation node 22, and place that information into the payload of incoming frames. The frames may then be communicated back to base transceiver station 16.

In contrast to compression operations that seek to continually replicate packets, the operation of communication system 10 may emulate a certain percentage of the previous comfort noise packet received. A network manger may access aggregation node 22 or cell site element 18 and manipulate settings in order to accommodate any particular comfort noise tolerance, sensitivity, or preference. Thus, a network manager may be able to achieve bit-by-bit comparisons (e.g. via an OR logic operation or an algorithm) and designate certain comfort noise percentages as allowable. For example, a network manager could determine that if comfort noise packets are less than 20% or 30% different from each other, then the second and subsequent packets are not to be communicated. This is because a service provider may have determined that it is acceptable that not all comfort noise packets are replicated for the call. The degree of this tolerance can be varied significantly based on particular communication needs.

Note that voice packets are not necessarily implicated by such an operation, as only the comfort noise packets are being suppressed. In other scenarios, where a network operator provides guidelines that are more sensitive to voice traffic and voice quality, settings may be relegated to accommodate these characteristics. In such a case, sequential comfort noise packets would need to be more similar in order for communication system 10 to simulate the comfort noise to be received at aggregation node 22. On the opposite end of the spectrum, where network operators care very little about the quality of comfort noise, comfort noise tolerances could be set at 50% or even greater. In such a scenario, sequential packets that were 50% different would still merit simulation such that the same packet is represented as the same comfort noise being received by aggregation node 22. Modifications to existing components or architecture upgrades for both cell site element 18 and aggregation node 22 may be executed in order to effectuate these operations. Additional details relating to cell site element 18 and aggregation node 22 are provided below with reference to FIG. 2.

Mobile station 13 is an entity, such as a client, subscriber, end user, or customer that seeks to initiate a communication session in communication system 10 via any suitable network. Mobile station 13 may operate to use any suitable device for communications in communication system 10. Mobile station 13 may further represent a communications interface for an end user of communication system 10. Mobile station 13 may be a cellular or other wireless telephone, an electronic notebook, a computer, a personal digital assistant (PDA), or any other device, component, or object capable of initiating a data exchange facilitated by communication system 10. Mobile station 13 may also be inclusive of any suitable interface to the human user or to a computer, such as a display, microphone, keyboard, or other terminal equipment (such as for example an interface to a personal computer or to a facsimile machine in cases where mobile station 13 is used as a modem). Mobile station 13 may alternatively be any device or object that seeks to initiate a communication on behalf of another entity or element, such as a program, a database, or any other component, device, element, or object capable of initiating a voice or a data exchange within communication system 10. Data, as used herein in this document, refers to any type of numeric, voice, video, audio-visual, or script data, or any type of source or object code, or any other suitable information in any appropriate format that may be communicated from one point to another.

Base transceiver stations 16 are communicative interfaces that may comprise radio transmission/reception devices, components, or objects, and antennas. Base transceiver stations 16 may be coupled to any communications device or element, such as mobile station 13 for example. Base transceiver stations 16 may also be coupled to base station controllers 24 (via one or more intermediate elements) that use a landline (such as a T1/E1 line, for example or in wireless applications a microwave or satellite T-1) interface. Base transceiver stations 16 may operate as a series of complex radio modems where appropriate. Base transceiver stations 16 may also perform transcoding and rate adaptation functions in accordance with particular needs. Transcoding and rate adaptation may also be executed in a GSM environment in suitable hardware or software (for example in a transcoding and rate adaptation unit (TRAU)) positioned between mobile switching center 25 and base station controllers 24.

In operation, communication system 10 may include multiple cell sites 12 that communicate with mobile stations 13 using base transceiver stations 16 and cell site element 18. Central office site 14 may use aggregation node 22 and base station controllers 24 for communicating with cell site 12. One or more network management systems 20 may be coupled to either cell site and central office site 14 (or both as desired), whereby mobile switching center 25 provides an interface between base station controllers 24 (of central office site 14) and PSTN 27, IP network 29, and/or any other suitable communication network. Base transceiver stations 16 may be coupled to cell site element 18 by a T1/E1 line or any other suitable communication link or element operable to facilitate data exchanges. A backhaul connection between cell site element 18 and aggregation node 22 may also include a T1/E1 line or any suitable communication link where appropriate and in accordance with particular needs.

Base station controllers 24 generally operate as management components for a radio interface. This may be done through remote commands to a corresponding base transceiver station within a mobile network. One base station controller 24 may manage more than one base transceiver station 16. Some of the responsibilities of base station controllers 24 may include management of radio channels and assisting in handover scenarios.

In operation, layer one based (e.g. time division multiplexed (TDM), GSM, etc.) or layer two-based (e.g. Frame Relay, high-level data link control (HDLC), asynchronous transfer mode (ATM), point to point protocol (PPP) over HDLC) traffic may be communicated by each base transceiver station 16 to cell site element 18 of cell site 12. Cell site element 18 may also receive IP or Ethernet traffic from network management system 20. Cell site element 18 may multiplex together payloads from the traffic that has a common destination. The multiplexed payloads, as well as any payloads extracted from the network management system IP or Ethernet traffic, may be communicated across a link to aggregation node 22 within central office site 14. Aggregation node 22 may demultiplex the payloads for delivery to an appropriate base station controller 24 or network management system 20. Note that network management system 20 could be any other suitable type of IP BTS element or access point (AP) where appropriate (e.g. IEEE 802.11, 802.16, 802.20, etc.) and in accordance with particular communication needs.

Mobile switching center 25 operates as an interface between PSTN 27 and base station controllers 24, and potentially between multiple other mobile switching centers in a network and base station controller 24. Mobile switching center 25 represents a location that generally houses communication switches and computers and ensures that its cell sites in a given geographical area are properly connected. Cell sites refer generally to the transmission and reception equipment or components that connect elements such as mobile station 13 to a network, such as IP network 29 for example. By controlling transmission power and radio frequencies, mobile switching center 25 may monitor the movement and the transfer of a wireless communication from one cell to another cell and from one frequency or channel to another frequency or channel. In a given communication environment, communication system 10 may include multiple mobile switching centers 25 that are operable to facilitate communications between base station controller and PSTN 27. Mobile switching center 25 may also generally handle connection, tracking, status, billing information, and other user information for communications in a designated area.

PSTN 27 represents a worldwide telephone system that is operable to conduct communications. PSTN 27 may be any land line network operable to facilitate communications between two entities, such as two persons, a person and a computer, two computers, or in any other environment in which data is exchanged for purposes of communication. According to one embodiment of the present invention, PSTN 27 operates in a wireless domain, facilitating data exchange between mobile station 13 and any other suitable entity within or external to communication system 10.

IP network 29 is a series of points or nodes of interconnected communication paths for receiving and transmitting packets of information that propagate through communication system 10. Note that IP network 29 may be coupled to a PDSN positioned between BSC 24 and itself. IP network 29 offers a communications interface between mobile stations 13 and any other suitable network equipment. IP network 29 may be any local area network (LAN), metropolitan area network (MAN), wide area network (WAN), virtual private network (VPN), wireless local area network (WLAN), or any other appropriate architectural system that facilitates communications in a network environment. IP network 29 implements a transmission control protocol/internet protocol (TCP/IP) communication language protocol in a particular embodiment of the present invention. However, IP network 29 may alternatively implement any other suitable communications protocol for transmitting and receiving data packets within communication system 10.

FIG. 2 is a simplified block diagram of an example implementation of communication system 10. The example of FIG. 2 offers just one of a myriad of potential arrangements that may be used to effectuate the operations of communication system 10, as described herein. It is important to note that FIG. 2 is offered only for purposes of example and teaching and, accordingly, should not be construed in any way to limit the broad scope of silence suppression being achieved by communication system 10. Moreover, any one or more of the components illustrated in FIG. 2 may be provided external to aggregation node 22 and cell site element 18 or provided in a single separate module or interface.

Cell site element 18 may include compressor 40 and a table 46, which may be included in a memory element 50. Aggregation node 22 may include a decompressor 42 and a memory element 52. Memory elements 50 and 52 are examples of computer readable media, which is storage media. Compressor 40 and decompressor 42 may cooperate with software or hardware (or have such software or hardware provided therein) to facilitate the silence suppression operations as described herein. Alternatively, any other suitable element, object, component, module, or device may be used for this purpose.

In operation of an example embodiment, compressor 40 may select a packet for simulation based on a comparison of incoming sequential packets. The comparison could be achieved using any suitable operation such as a simple OR algorithm. The algorithm may be provided in any suitable location of cell site element 18. The sensitivity of the algorithm may be determined by a network operator, a service provider, a system administrator, or any other suitable authorized entity. The algorithm can be integrated into appropriate logic that can delineate between comfort noise and voice signals. Compressor 40 may signal to decompressor 42 (by the lack of a payload) that decompressor 42 needs to provide the payload. Decompressor 42 may be relegated the task of filling in a payload for whatever interface (e.g. an A-bis interface) that is facilitating such communications. Decompressor may maintain a comfort noise packet in memory such that it can be readily replicated and used for emulation purposes.

The sensitivity or determination for comfort noise may be determined by settings that are made by a network operator or system administrator, who may properly configure cell site element 18. This information can be generally stored in table 46. When cell site element 18 receives the IS634 frame (for one example protocol), a context is established. Cell site element 18 may save the first incoming packet to memory element 50. This incoming packet may be used for a comparison to be made with the next sequential comfort noise packet. The full frame may be sent to aggregation node 22, which may also establish its suppression context state. This may be stored in memory element 52. Where a subsequent comfort noise packet or frame is received, table 46 may be referenced in order to determine how much different the new sequential packet's payload is from the data payload of the packet stored in memory. Thus, in a general sense, the contents of the sequential packets are being compared. Cell site element 18 may send the suppressed frame, which in the example provided, may include an IS634 header with a payload of zero. The comfort noise has effectively been removed.

Aggregation node 22 recognizes that the incoming frame will have no payload. Aggregation node 22 has been primed to receive such information. Aggregation node 22 understands that a packet that it receives with a zero-byte load corresponds to comfort noise. Aggregation node 22 may retrieve the context that it set up and position the appropriate payload in the packet and then communicate that packet to its intended next destination. In essence, cell site element 18 lets aggregation node 22 know of the incoming comfort noise. Cell site element 18 then signals to aggregation node 22 to supply the appropriate payload (based on the established context) and then send the packet on to its intended next generation.

Memory element 50 may store table 46 or table 46 may be provided external thereto. Memory element 50 and 52 may store information to be accessed by cell site element 18 and aggregation node 22 respectively. Memory elements 50 and 52 may be an internal memory unit or provided external to any number of elements within communication system 10. Memory elements 50 and 52 may be any suitable memory element, such as a read only memory (ROM), a random access memory (RAM), a dynamic random access memory (DRAM), a fast cycle RAM (FCRAM), a static RAM (SRAM), a field programmable gate array (FPGA), an erasable programmable read-only memory (EPROM), an EEPROM, a microcontroller, a microprocessor, or any other suitable memory unit, device, or object that operates to store data.

It is critical to note that the use of the terms 'aggregation node' and 'cell site element' herein in this document only connotes an example representation of one or more elements associated with base transceiver station 16 and base station controller 24. These terms have been offered for purposes of example and teaching only and do not necessarily imply any particular architecture or configuration. Moreover, the terms 'cell site element' and 'aggregation node' are intended to encompass any network element operable to facilitate a data exchange in a network environment. Accordingly, cell site element 18 and aggregation node 22 may be routers, switches, bridges, gateways, interfaces, or any other suitable module, device, component, element or object operable to effectuate one or more of the operations, tasks, or functionalities associated with compressing or suppressing data as implied, described, or offered herein.

Each aggregation node 22 or cell site element 18 may include a framer, a time-switch element, a forwarder, and a routing functionality element that is operable to direct packets in the network. Each of aggregation node and cell site element 18 may perform similar data management techniques. Each of these elements may also include any suitable hardware, software, object, or element operable to execute one or more of their functionalities (e.g. suppression, compression, decompression, multiplexing, demultiplexing, etc.), which may be based on particular needs. Additionally, such elements may be inclusive of suitable algorithms that operate to process data properly in a communications environment. For example, appropriate algorithms and software may be used in order to identify the comfort noise being communicated between base transceiver station 16 and base station controller 24.

FIG. 3 is a simplified flowchart illustrating a series of example steps associated with a method for suppressing comfort noise in accordance with one embodiment of the present invention. The flowchart may begin at step 100 where an end user initiates a call using mobile station 13. The call may be received (in this example) by another end user utilizing a wireless or a landline phone. At step 102, the end user stops talking, whereby the codec (which can generally detect the absence of voice data) associated with mobile station 13 begins generating comfort noise.

At step 104, cell site element 18 may identify a difference in sequential comfort noise packets being received. The sensitivity of this operation may be determined by settings that are made by a network operator or system administrator, who configures cell site element 18. This information is generally stored in table 46. Cell site element 18 may receive the IS634 frame (for this example protocol) and a context is established. Cell site element 18 may save the first incoming packet to memory element 50 at step 106. This incoming packet may be used for a comparison to be made with the next sequential comfort noise packet.

At step 108, the full frame is sent to aggregation node 22, which also establishes its suppression context state. Where a subsequent comfort noise packet or frame is received, table 46 may be referenced at step 110 to determine how much different the new sequential packet's payload is from the data payload of the packet stored in memory. Hence, the contents of the sequential packets are compared. At step 112, cell site element 18 sends the suppressed frame, which in this example provided, includes the IS634 header having a payload of zero. The comfort noise has been removed. At step 114, aggregation node 22 recognizes that the incoming frame will have no payload. Aggregation node 22 has been primed to receive such information. Aggregation node 22 understands that a packet that is receives with a zero-byte load corresponds to comfort noise. At step 116, aggregation node 22 may retrieve the context that it set up and position the appropriate payload in the packet and then communicate that packet to its intended next destination.

Subsequent incoming comfort noise frames may differ from the designated noise comfort parameters. In such a case, the comfort noise packets generated by the codec would be unaltered and passed through from cell site element 18 to aggregation node 22. In other example scenarios, where the comfort noise parameters varied slightly, but still fell under the designated percentages, a new context could be established at both cell site element 18 and aggregation node 22. In such a scenario, only the change or delta may be communicated in order to alter the context and effectuate a change in the payload that will be provided by aggregation node 22.

Some of the steps illustrated in FIG. 3 may be changed or deleted where appropriate and additional steps may also be added to the flowchart. These changes may be based on specific communication system architectures or particular networking arrangements or configurations and do not depart from the scope or the teachings of the present invention.

Although the present invention has been described in detail with reference to particular embodiments illustrated in FIGS. 1 through 3, it should be understood that various other changes, substitutions, and alterations may be made hereto without departing from the spirit and scope of the present invention. For example, although the present invention has been described with reference to a number of elements included within communication system 10, these elements may be rearranged or positioned in order to accommodate any suitable routing architectures. In addition, any of these elements may be provided as separate external components to communication system 10 or to each other where appropriate. The present invention contemplates great flexibility in the arrangement of these elements as well as their internal components.

In addition, although the preceding description offers a suppression protocol to be implemented with particular devices (e.g. aggregation node 22 and cell site element 18), the suppression protocol provided may be embodied in a fabricated module that is designed specifically for effectuating the suppression techniques as provided above. Moreover, such a module may be compatible with any appropriate protocol other than the described platforms, which were offered for purposes of teaching and example only.

Additionally, although numerous example embodiments provided above reference voice data, communication system 10 may cooperate with any other type of data in which suppression protocols are applicable. For example, normative or standard data, video data, and audio-visual data may benefit from the teachings of the present invention. Communication system 10 provides considerable adaptability in that it may be used in conjunction with any immaterial information that is sought to be suppressed in a communications environment.

Numerous other changes, substitutions, variations, alterations, and modifications may be ascertained to one skilled in the art and it is intended that the present invention encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this invention in any way that is not otherwise reflected in the appended claims.

What is claimed is:

1. An apparatus for suppressing data, comprising:
a cell site element associated with a base transceiver station in communication with a mobile station of an end user, the cell site element operable to:
   receive a first packet comprising a first payload communicated by the mobile station, the first payload comprising a first voice sample of comfort noise;
   communicate the first packet to an aggregation node configured to build a context from the first payload;
   determine a comfort noise difference between a second payload of a second packet received by the cell site element and the first payload, the second payload comprising a second voice sample of comfort noise;
   if the difference is greater than a predetermined threshold, communicate the second packet with the second payload, the predetermined threshold representing a maximum acceptable comfort noise difference;
   if the difference is smaller than the predetermined threshold:
      communicate the second packet without the second payload to the aggregation node; and
      communicate a delta corresponding to the difference to the aggregation node, the aggregation node configured to insert an equivalent payload for the second packet that is based on the context and the delta into the second packet and send the second packet to a base station controller.

2. The apparatus of claim 1, wherein the cell site element includes a compressor that is operable to compress a communication flow associated with the first packet.

3. The apparatus of claim 1, wherein the cell site element is operable to reference a table in order to identify the predetermined threshold.

4. The apparatus of claim 3, wherein the cell site element includes a memory element that is operable to store the table.

5. The apparatus of claim 1, wherein the cell site element is further operable to build the context associated with the first packet such that it may be compared to the second packet in terms of comfort noise levels.

6. An apparatus for suppressing data, comprising:
an aggregation node associated with a base station controller and operable to:
   receive a first packet comprising a first payload from a cell site element, the first packet sent to the cell site element from a mobile station of an end user, the first payload comprising a first voice sample of comfort noise;
   build a context that is associated with comfort noise and that is based on the first payload;
   receive a second packet from which a second payload has been removed by the cell site element because a comfort noise difference between the first payload and the second payload was greater than a predetermined payload, the second payload comprising a second voice sample of comfort noise, the predetermined threshold representing a maximum acceptable comfort noise difference;

receive a delta corresponding to the difference between the first payload and the second payload; and insert an equivalent payload for the second packet that is based on the context and the delta into the second packet and send the second packet to a base station controller.

7. The apparatus of claim 6, wherein the aggregation node includes a decompressor that is operable to decompress a communication flow associated with the first packet.

8. The apparatus of claim 6, wherein the aggregation node is operable to reference a memory element in order to identify the context.

9. A method for suppressing data, the method executed by one or more processors, the method comprising:

receiving a first packet at a cell site element associated with a base transceiver station in communication with a mobile station of an end user, the first packet comprising a first payload communicated by the mobile station, the first payload comprising a first voice sample of comfort noise;

communicating the first packet to an aggregation node configured to build a context from the first payload;

determining a comfort noise difference between a second payload of a second packet and the first payload, the second payload comprising a second voice sample of comfort noise;

if the difference is greater than a predetermined threshold, communicating the second packet with the second payload, the predetermined threshold representing a maximum acceptable comfort noise difference; and if the difference is smaller than the predetermined threshold:

communicating the second packet without the second payload to the aggregation node; and communicating a delta corresponding to the difference to the aggregation node, the aggregation node configured to insert an equivalent payload for the second packet that is based on the context and the delta into the second packet and send the second packet to a base station controller.

10. The method of claim 9, further comprising:

referencing a table in order to identify the predetermined threshold.

11. The method of claim 10, further comprising:

storing the table in a memory element.

12. The method of claim 9, further comprising:

building a context associated with the first packet such that it may be compared to the second packet in terms of comfort noise levels.

13. A system for suppressing data, comprising:

means for receiving a first packet at a cell site element associated with a base transceiver station in communication with a mobile station of an end user, the first packet comprising a first payload communicated the mobile station, the first payload comprising a first voice sample of comfort noise;

means for communicating the first packet to an aggregation node configured to build a context from the first payload;

means for determining a comfort noise difference between a second payload of a second packet and the first payload, the second payload comprising a second voice sample of comfort noise;

means for, if the difference is greater than a predetermined threshold, communicating the second packet with the second payload, the predetermined threshold representing a maximum acceptable comfort noise difference; and means for, if the difference is smaller than the predetermined threshold:

communicating the second packet without the second payload to the aggregation node; and communicating a delta corresponding to the difference to the aggregation node, the aggregation node configured to insert an equivalent payload for the second packet that is based on the context and the delta into the second packet and send the second packet to a base station controller.

14. The system of claim 13, further comprising:

means for building a context based on the first packet;

means for receiving the second packet; and means for supplying an equivalent payload for the second packet that is based on the context.

15. The system of claim 13, further comprising:

means for building a context associated with the first packet such that it may be compared to the second packet in terms of comfort noise levels.

16. Software for suppressing data, the software being embodied in a non-transitory computer readable medium and comprising computer code such that when executed by one or more processors is operable to:

receive a first packet at a cell site element associated with a base transceiver station in communication with a mobile station of an end user, the first packet comprising a first payload communicated by the mobile station, the first payload comprising a first voice sample of comfort noise;

communicate the first packet to an aggregation node configured to build a context from the first payload;

determine a comfort noise difference between a second payload of a second packet and the first payload, the second payload comprising a second voice sample of comfort noise;

if the difference is greater than a predetermined threshold, communicate the second packet with the second payload, the predetermined threshold representing a maximum acceptable comfort noise difference; and if the difference is smaller than the predetermined threshold:

communicate the second packet without the second payload to the aggregation node; and communicate a delta corresponding to the difference to the aggregation node, the aggregation node configured to insert an equivalent payload for the second packet that is based on the context and the delta into the second packet and send the second packet to a base station controller.

17. The medium of claim 16, wherein the code is further operable to:

build a context based on the first packet;

receive the second packet; and supply an equivalent payload for the second packet that is based on the context.

18. The medium of claim 16, wherein the code is further operable to:

reference a table in order to identify the predetermined threshold.

19. The medium of claim 16, wherein the code is further operable to:

build a context associated with the first packet such that it may be compared to the second packet in terms of comfort noise levels.

20. A method for suppressing data, the method executed by one or more processors, the method comprising:

receiving a first packet comprising a first payload at a cell site element, the first packet sent to the cell site element from a mobile station of an end user, the first payload comprising a first voice sample of comfort noise;

building a context that is associated with comfort noise and that is based on the first packet;

communicating the first packet to an aggregation node configured to build a context from the first payload;

receiving a second packet;

supplying an equivalent payload for the second packet that is based on the context, wherein a table is referenced in order to identify the context;

identifying, by the cell site element, a comfort noise difference between a second payload of the second packet and the first payload, the second payload comprising a second voice sample of comfort noise;

if the difference is greater than a predetermined threshold, communicating, by the cell site element, the second packet with the second payload, the predetermined threshold representing a maximum acceptable comfort noise difference; and if the difference is smaller than the predetermined threshold:

communicating, by the cell site element, the second packet to the aggregation node the second payload to the aggregation node; and communicating, by the cell site element, a delta corresponding to the difference to the aggregation node, the aggregation node configured to insert an equivalent payload for the second packet that is based on the context and the delta into the second packet and send the second packet to a base station controller.

\* \* \* \* \*